US012050145B2

United States Patent
Hügel et al.

(10) Patent No.: US 12,050,145 B2
(45) Date of Patent: Jul. 30, 2024

(54) RELATIVE-PRESSURE SENSOR COMPRISING A REFERENCE-PRESSURE SUPPLY

(71) Applicant: Endress+Hauser SE+Co. KG, Maulburg (DE)

(72) Inventors: Michael Hügel, Offenburg (DE); Nils Ponath, Lörrach (DE); Armin Rupp, Weil am Rhein (DE); Frank Volz, Freiburg (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 264 days.

(21) Appl. No.: 17/756,817

(22) PCT Filed: Nov. 20, 2020

(86) PCT No.: PCT/EP2020/082847
§ 371 (c)(1),
(2) Date: Jun. 2, 2022

(87) PCT Pub. No.: WO2021/110430
PCT Pub. Date: Jun. 10, 2021

(65) Prior Publication Data
US 2022/0412830 A1    Dec. 29, 2022

(30) Foreign Application Priority Data
Dec. 2, 2019   (DE) .......................... 102019132724.5

(51) Int. Cl.
*G01L 19/06*    (2006.01)
*G01L 13/02*    (2006.01)

(52) U.S. Cl.
CPC ........ *G01L 19/0654* (2013.01); *G01L 13/025* (2013.01)

(58) Field of Classification Search
None
See application file for complete search history.

(56) References Cited

U.S. PATENT DOCUMENTS

2013/0019687 A1 *   1/2013   Wosnitza ............ G01L 19/0654
                                                                73/700

FOREIGN PATENT DOCUMENTS

| CH | 255745 A | 7/1948 |
|---|---|---|
| CN | 1768256 A | 5/2006 |

(Continued)

*Primary Examiner* — Brandi N Hopkins
*Assistant Examiner* — Nigel H Plumb
(74) *Attorney, Agent, or Firm* — Brannon Sowers & Cracraft PC; Kelly J. Smith

(57) ABSTRACT

A relative-pressure sensor for determining a pressure of a medium in relation to an atmospheric pressure includes a housing; a measuring element arranged in the housing, wherein the pressure to be measured acts upon an outer surface of the measuring element in contact with the medium; a reference-pressure supply, which supplies an inner surface of the measuring element with atmospheric pressure in the form of ambient air, an evaluation unit, which determines the pressure of the medium from a variable determined using the measuring element; and at least one drying chamber arranged in the housing for taking up atmospheric humidity from the ambient air supplied through the reference-pressure supply. A bushing can be pressed into the housing and has a capillary-type groove, which is helical at least in sections and runs around the bushing.

13 Claims, 2 Drawing Sheets

(56) References Cited

FOREIGN PATENT DOCUMENTS

| | | | |
|---|---|---|---|
| CN | 102834715 | A | 12/2012 |
| CN | 104246463 | A | 12/2014 |
| CN | 106461491 | A | 2/2017 |
| DE | 29620122 | U1 | 1/1997 |
| DE | 10200780 | A1 | 7/2003 |
| DE | 102007000143 | A1 | 9/2008 |
| DE | 102010003709 | A1 * | 10/2011 |
| DE | 102010003709 | A1 | 10/2011 |
| DE | 102011080142 | A1 | 1/2013 |
| DE | 102011082624 | A1 | 3/2013 |
| EP | 3273215 | A1 | 1/2018 |
| EP | 3273215 | A1 * | 1/2018 |
| JP | 8304201 | A | 11/1996 |
| JP | 08304201 | A | 11/1996 |
| WO | 03058186 | A2 | 7/2003 |
| WO | 2011124418 | A1 | 10/2011 |

\* cited by examiner

RELATIVE-PRESSURE SENSOR COMPRISING A REFERENCE-PRESSURE SUPPLY

CROSS-REFERENCE TO RELATED APPLICATIONS

The present application is related to and claims the priority benefit of German Patent Application No. 102019132724.5, filed on Dec. 2, 2019, and International Patent Application No. PCT/EP2020/082847, filed Nov. 20, 2020, the entire contents of which are incorporated herein by reference.

TECHNICAL FIELD

The present invention relates to a relative-pressure sensor for determining a pressure of a medium in relation to an atmospheric pressure, the sensor comprising a housing; a measuring element arranged in the housing, wherein the pressure to be measured acts upon an outer surface of the measuring element, said surface being in contact with the medium; a reference-pressure supply, which supplies an inner surface of the measuring element with atmospheric pressure in the form of ambient air; an evaluation unit, which determines the pressure of the medium from a variable determined using the measuring element; and at least one drying chamber arranged in the housing for taking up atmospheric humidity from the ambient air supplied through the reference-pressure supply. The medium whose pressure is to be determined is in this case liquid or gaseous.

BACKGROUND

In pressure measurement technology, absolute-pressure sensors, differential-pressure sensors, and relative-pressure sensors are known. Absolute-pressure sensors determine the prevailing pressure absolutely, i.e., in relation to vacuum, while differential-pressure sensors determine the difference between two different pressures. In the case of relative-pressure sensors, the pressure to be measured is determined relative to a reference pressure, wherein the atmospheric pressure prevailing in the environment of the relative-pressure sensor serves as reference pressure. Relative-pressure sensors have a pressure-sensitive measuring element— generally a membrane—which is arranged on the process side in the interior of the relative-pressure sensor so that the pressure to be measured of the medium acts upon the outer surface of the measuring element. The atmospheric pressure, which is supplied to the measuring element from the environment by means of a reference-pressure supply, acts upon the inner surface of the measuring element. The measuring element bends as a function of the relative pressure present, the relative pressure being formed from the difference between the pressure to be measured and the atmospheric pressure. This bending is converted by means of an evaluation unit into an electrical signal which depends upon the relative pressure and is then available for further processing or evaluation. The companies of the Endress+Hauser Group manufacture and market a variety of such relative-pressure sensors.

The relative-pressure sensor can determine the pressure to be measured according to various methods, e.g., in a capacitive or piezo-resistive manner.

In a capacitive relative-pressure sensor, a membrane is provided with a first electrode, and the side, opposite the membrane, of a measuring chamber is provided with a second and in some cases with a third electrode. The second electrode together with the first electrode forms a measuring capacitor, which is particularly sensitive to bending of the membrane, so that the relative pressure can be determined from the capacitance value. The third electrode serves as a reference electrode and, together with the first electrode, forms a reference capacitor, which is substantially pressure-independent and is influenced by temperature, atmospheric humidity, and other environmental parameters. By means of the capacitance of the reference capacitor, interference signals, such as temperature-dependent capacitance changes, can thus be compensated for.

Another group of known relative sensors has a membrane on which strain-sensitive elements, such as strain gauge strips, are arranged. The strain gauge strips are frequently arranged in the form of a Wheatstone-like measuring bridge. The resistance of the strain gauge strips is dependent upon the bending of the membrane and is evaluated to determine the applied pressure.

Piezo-resistive relative sensors have a sensitive layer, whose electrical properties depend upon the applied pressure. This layer is not directly acted upon by the pressure to be measured, but is in contact with the medium via a diaphragm seal. The diaphragm seal can be a solid body or a pipe filled with an incompressible liquid, such as oil, and sealed against the process by a pressure-sensitive membrane.

Relative-pressure sensors are frequently used in industrial processes in which they are exposed to great temperature fluctuations and temperature differences between the process and the environment. In the event of sudden cooling, the dew point of the air in an interior of the relative-pressure sensor can be exceeded, which leads to the atmospheric humidity condensing on cold parts within the relative-pressure sensor. The atmospheric humidity can, especially, pass through the opening in the relative-pressure sensor to the environment, which is necessary for providing the reference pressure for the measuring element, and through the reference-pressure supply into the relative-pressure sensor.

The evaluation unit is generally very sensitive to humidity. For reliable determination of the pressure, it must therefore be ensured that no or only a little humidity enters or condenses within the relative-pressure sensor. Ideally, the relative-pressure sensor and specifically the reference-pressure supply are constructed such that only dry air reaches the measuring element and the evaluation unit. As a rule, the reference-pressure supply conducts the ambient pressure from an opening in the relative-pressure sensor, which is frequently arranged in the housing of the relative-pressure sensor, to the inner surface of the measuring element or of the membrane. In some cases, a drying chamber is arranged between the opening and the measuring element, the drying chamber removing humidity from the supplied ambient air from the reference-pressure supply and thus drying the ambient air.

Various possibilities for the reference-pressure supply are known from the prior art. Reference-pressure supplies wound in sections are frequently used as diffusion barriers in order to delay the penetration of humidity into an interior of the relative-pressure sensor.

DE 10 2010 003 709 A1 discloses a relative-pressure sensor with a reference-pressure supply, which is divided into two successive sections: a long, helical, input capillary and a substantially straight section within the housing. The input capillary can be arranged inside or outside the housing and guides the ambient pressure from the environment of the relative-pressure sensor to an interior of the relative-pressure sensor. The straight section guides the ambient pressure from the interior past a drying chamber to the measuring element. The input capillary is provided as a separate tube, which accordingly requires space within the relative-pressure sensor. Regardless of how the input capillary is arranged relative to the housing, high tightness at the opening in the housing through which the input capillary runs is required in order to ensure that the ambient air enters the interior exclusively through the input capillary. The input capillary can be sealed at the opening by means of a glass feedthrough, for example, which requires a further process step.

DE 102 00 780 A1 describes a relative-pressure sensor which comprises a reference-pressure supply in the form of a wound or helical groove within a plane of a component of the relative-pressure sensor. In addition, a filter element is provided which is arranged at the atmosphere-side opening in the reference-pressure supply in order to prevent the penetration of humidity into the relative-pressure sensor. In order to seal the groove, a cover is fastened to the component. The groove is thus sealed in a relatively complex manner with an additional element, wherein high tightness between the component and the cover is required so that the ambient air is actually guided exclusively along the groove to the measuring element.

EP 3 273 215 A1 discloses a relative-pressure sensor with a reference-pressure supply, which is arranged at least in sections as a groove within a side wall of an electronics housing. The groove is guided in a meandering manner in the side wall. In order to complete the outwardly-open groove, a self-adhesive, air-impermeable film is glued as a closure means in the region of the groove onto the electronics housing. Alternatively, the closure means can also be designed as a separate housing part. Here, too, for sealing the groove, a separate closure means, i.e., film or housing part, is required, which requires a high degree of tightness when the groove is closed, so that the ambient air is guided only within the groove into the interior of the relative-pressure sensor.

Starting from the cited prior art, the aim of the present invention is to develop a relative-pressure sensor in which it is ensured in a simple manner that the ambient air is guided exclusively along the reference-pressure supply into an interior of the relative-pressure sensor.

SUMMARY

The aim is achieved according to the invention by a relative-pressure sensor for determining a pressure p1 of a medium relative to an atmospheric pressure p2, the sensor comprising
  a housing;
  a measuring element arranged in the housing, wherein the pressure p1 to be measured acts upon an outer surface of the measuring element, said surface being in contact with the medium;
  a reference-pressure supply, which supplies the atmospheric pressure p2 in the form of ambient air to an inner surface of the measuring element;
  an evaluation unit, which determines the pressure p1 of the medium from a variable determined using the measuring element;
  and at least one drying chamber arranged in the housing for taking up atmospheric humidity from the ambient air supplied through the reference-pressure supply.

In addition, an opening for the reference-pressure supply is provided in an outer wall of the housing, as well as a cylindrical bushing for the receiving and feeding-through of the connecting lines of the electronics and of the reference-pressure supply. The bushing is designed such that it can be pressed into the housing, wherein the bushing has, in an outer wall facing the inner wall of the housing, a capillary-type groove, which is helical at least in sections and runs around the bushing. In this case, the groove is arranged with respect to the housing such that the reference-pressure supply from the opening in the housing to the interior of the bushing takes place exclusively along the groove.

When the bushing is pressed into the housing, the outer wall of the bushing is, advantageously, deformed so that the ambient air cannot pass from a first section of the groove into a second section of the groove along a region between the outer wall of the bushing and the inner wall of the housing. Such passing of the ambient air between individual sections of the groove is particularly critical for the helical section of the groove, since, here, sometimes only little of the outer wall is present between the individual sections of the groove. Pressing the bushing into the housing ensures that the outer wall of the bushing is deformed, e.g., flattened, and that a hermetically-sealing region is thereby created between the outer wall of the bushing and the inner wall of the housing. In one possible embodiment, the helical section of the groove is designed in the form of a thread, so that a cylindrical sealing region is present between the individual sections of the helical groove after the press fitting. Pressing the bushing into the housing consequently ensures that the ambient air flows from the opening in the housing to the interior of the bushing exclusively within the groove. In contrast to previous solutions, no further element is required for sealing the groove, i.e., neither a separate housing, nor a film, nor a cover. The bushing can be used for many relative-pressure sensors; it can especially be used in a space-saving manner even in relative-pressure sensors with small interiors.

In a preferred embodiment, the groove starts in an end section of the bushing and ends in an opposite end section of the bushing. The groove thus extends along the entire length of the bushing. Accordingly, a length of the groove is achieved that is particularly suitable for slowing down the diffusion of humidity into the interior of the relative-pressure sensor.

In a further embodiment, the groove has a length and a cross-section, wherein the groove comprises such a volume that, when the entire air volume is compressed within the reference-pressure supply as a result of a temperature reduction, the groove is only partially filled with new ambient air from the environment of the relative-pressure sensor. In this case, the reference-pressure supply is designed such that the air volume in the reference-pressure supply between the interior of the bushing and the measuring element is not many times greater than the air volume in the groove. A significant change in temperature generally occurs on the process side of the relative-pressure sensor and, in the case of a temperature reduction and the resulting compression of the air volume in the interior of the relative-pressure sensor, leads to the ambient air being aspirated in the direction of the measuring element. For such a case, the reference-pressure supply must be designed such that, despite a sudden temperature reduction, no moist ambient air is aspirated into the relative-pressure sensor. Consequently, the groove must comprise such a volume that the ambient air, which is already within the groove, is completely aspirated into the interior of the relative-pressure sensor when there is no change in temperature. Such an embodiment, especially, makes the use of an additional filter element superfluous.

Advantageously, the bushing is made of brass or bronze. This facilitates the pressing of the bushing into the housing and the necessary deformation of the outer wall of the bushing.

It is advantageous here if the housing is made of stainless steel. Stainless steel, as a comparatively hard material, promotes the deformation of the outer wall of the bushing during the press fitting.

It is also advantageous if the bushing is connected to the housing by press fitting, especially, joining by thermal expansion or shrinking. During joining by thermal expansion, the bushing to be inserted into the housing is cooled or shrunk, and subsequently pressed into the housing. Through the expansion of the bushing during heating, a form-fitting connection between bushing and housing is attained. By cooling the bushing, the formation of small scores in the outer wall of the bushing due to friction during the press fitting can, furthermore, be avoided. Such scores could otherwise lead to the ambient air entering the interior of the bushing via the scores instead of the groove. Dry ice, for example, can be used for cooling the bushing.

In a further embodiment, a section with an enlargement of the outer diameter of the bushing is arranged on an end region, facing the measuring element, of the bushing, wherein the housing has a section with an enlargement of the inner diameter which corresponds to the section with the enlargement of the outer diameter of the bushing. After the bushing has been introduced into the housing, the corresponding sections of the enlargement of the outer diameter of the bushing and of the enlargement of the inner diameter of the housing join one another in a gas-tight manner. This ensures that the ambient air from the reference-pressure supply does not penetrate into the interior of the relative-pressure sensor through the end region, facing the measuring element, of the bushing. The enlargement of the outer diameter of the bushing can, for example, be an edge or a shoulder.

A preferred embodiment involves a bottom surface, which closes the bushing perpendicularly to the longitudinal axis of the bushing, being arranged on the end region, facing the measuring element, of the bushing, wherein the bottom surface has at least one opening for the feeding-through of the connecting lines of the electronics and of the reference-pressure supply. The arrangement of the bottom surface with at least one opening leads to a spatial delimitation of the bushing from the drying chamber and the measuring element. Drying chambers are frequently provided with molded bodies, which can take up humidity from the reference-pressure supply and thus attract humidity. Sometimes, the rate of humidity take-up through the drying chamber can be quite high. In the case of a bushing without a bottom surface, the volume of the interior of the relative-pressure sensor is available to the drying chamber for taking up humidity. If the ambient air in the interior of the bushing is continuously dried by the drying chamber, the diffusion of humidity through the groove into the interior of the bushing is accelerated. The placement of the bottom surface, including its opening, reduces this effect.

Advantageously, the bottom surface of the bushing is designed as a cast or a glass feedthrough. The bottom surface can thus also still be introduced after the bushing has been pressed in. The cast and also the glass feedthrough have a high tightness at the contact surface between the bottom surface and the bushing, so that the reference-pressure supply is guided exclusively through the at least one opening in the bottom surface.

Preferably, the reference-pressure supply is designed in sections as a humidity-permeable tube, wherein the tube is inserted into the at least one opening in the bottom surface in such a way that the reference-pressure supply from an interior of the bushing through the drying chamber to the measuring element takes place exclusively through the tube. The use of a tube in this case ensures a reduction in the air volume in the reference-pressure supply in comparison to an arrangement without a tube. This also serves to limit the rate of humidity take-up of the drying chamber. The humidity from the ambient air within the reference-pressure supply can diffuse from the humidity-permeable wall of the tube and be adsorbed by the drying chamber.

In an additional embodiment, the drying chamber has a drying module for receiving a humidity-adsorbing material or a molded body comprising a polymer matrix and zeolite. The drying chamber can be separated from the reference-pressure supply or the tube by a humidity-permeable wall.

The invention is explained in greater detail with reference to the following drawings, FIGS. 1-2. The following are shown:

DETAILED DESCRIPTION

The present invention is applicable to a variety of relative-pressure sensors which are based upon different measuring principles. Relative-pressure sensors are used for determining a pressure p1 of a medium in relation to an atmospheric pressure p2, the sensors comprising a housing; a measuring element arranged in the housing, wherein the pressure p1 to be measured acts upon an outer surface of the measuring element, said surface being in contact with the medium; a reference-pressure supply, which supplies an inner surface of the measuring element with atmospheric pressure p2 in the form of ambient air; an evaluation unit, which determines the pressure p1 of the medium from a variable determined using the measuring element; and at least one drying chamber arranged in the housing for taking up atmospheric humidity from the ambient air supplied through the reference-pressure supply. Corresponding relative-pressure sensors are manufactured and marketed by the applicant, e.g., under the names, "Cerabar" and "Ceraphant."

Figure 1:
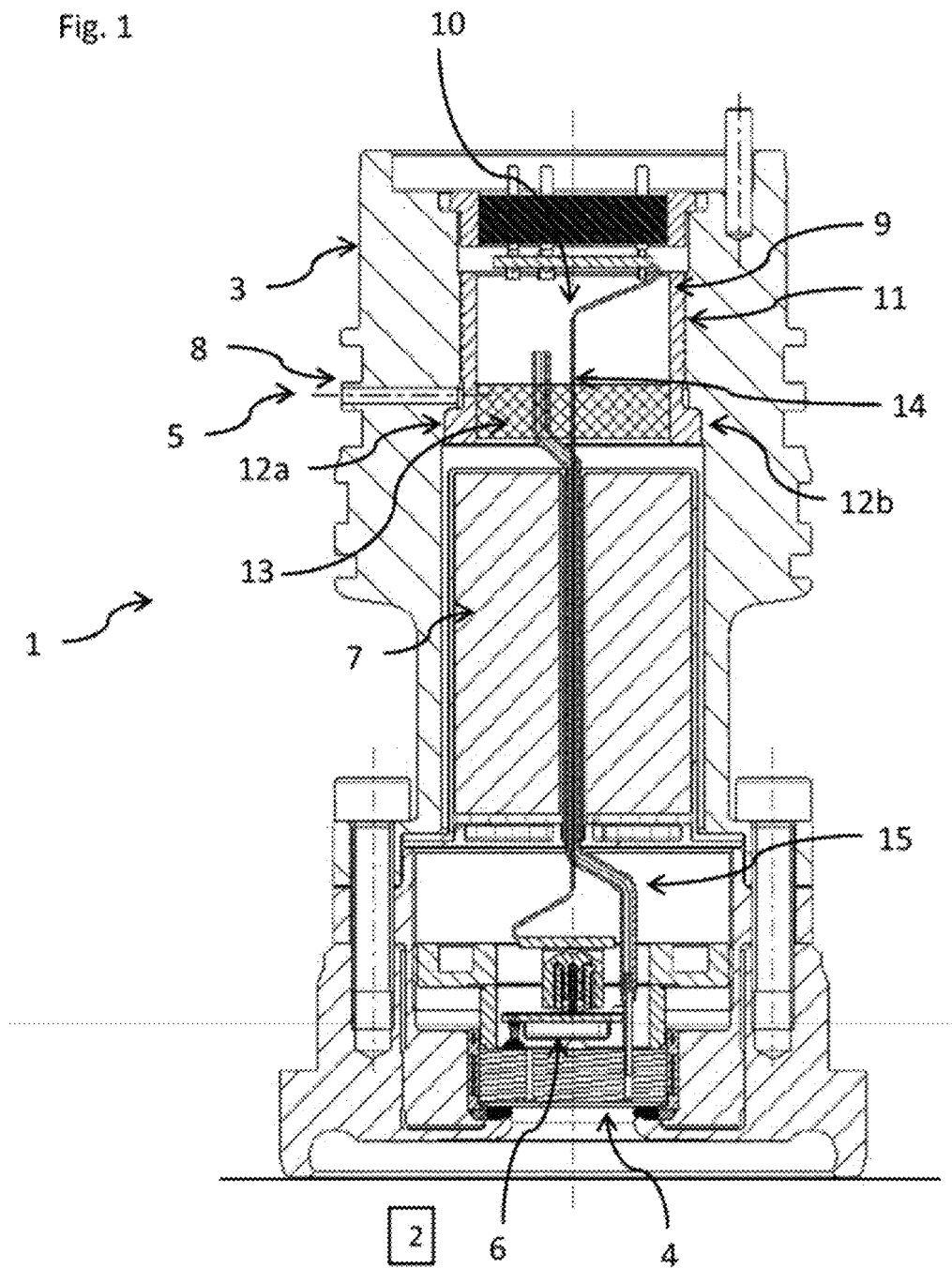
FIG. 1 shows an embodiment of the relative-pressure sensor according to the invention with the bushing, which is arranged in the housing.

The relative-pressure sensor 1 in FIG. 1 comprises a housing 3, a drying chamber 7, a reference-pressure supply 5, a measuring element 4, and an evaluation unit 6. Located in the outer wall of the housing 3 is an opening 8 for the reference-pressure supply 5, which allows the ambient air to enter the interior of the relative-pressure sensor 1. The opening 8 leads into the capillary-type groove 11, which is helical at least in sections, in the outer wall, which faces the housing 3, of the cylindrical bushing 9, which is pressed into the housing 3. Connecting lines of the electronics 10 also extend through the bushing 9. In FIG. 1, the groove 11 has a completely helical design. Other possibilities for the design of the groove 11 with respect to its shape and length are therefore not ruled out. In addition, the groove 11 begins in an end region of the bushing 9 and ends in the opposite end region of the bushing 9, so that the largest possible length of the groove 11 is achieved. The ambient air is guided exclusively through the opening 8 and along the groove 11 from the environment into the interior of the bushing 9.

The length and the cross-section of the groove 11 are important for slowing the entry of the humidity into the interior of the relative-pressure sensor 1, but also in the case of a large drop in temperature. In the case of a temperature reduction, the ambient air is compressed within the relative-pressure supply 5, and new ambient air is thus additionally taken up from the environment. The groove 11 is therefore designed in such a way that ambient air already present in the groove 11 is never completely aspirated into the interior of the relative-pressure sensor 1 in the case of any temperature drop within the operating range of the relative-pressure sensor 1.

In FIG. 1, the bushing 9 is made of brass or bronze, and the housing 3 is made of stainless steel in order to be able to particularly easily press the bushing 9 into the housing 3. Other embodiments of bushing 9 and housing 3 are therefore not ruled out. The bushing 9 made of brass or bronze is connected to the housing 3 by means of joining by thermal expansion.

The bushing 9 also has a section with an enlargement of the outer diameter 12a, which faces the measuring element 4. The housing 3 has a section 12b corresponding to this section of the bushing 12a and having an enlargement of the inner diameter. In FIG. 1, the corresponding sections 12a, b are each designed as a shoulder, wherein other embodiments are also possible. After pressing the bushing 9 into the housing 3, the two corresponding shoulders 12a, b join each other in a gas-tight manner.

In an end region in the direction of the measuring element 4, the bushing 9 is closed perpendicularly to its longitudinal axis with a bottom surface 13. In FIG. 1, the bottom surface 13 is designed as a glass feedthrough, but a cast or other form of a bottom surface 13 is also conceivable. Two openings 14 for the feeding-through of the connecting lines of the electronics 10 and of the reference-pressure supply 5 are provided in the bottom surface 13. A humidity-permeable tube 15 is inserted into an opening 14 of the bottom surface 13, wherein the reference-pressure supply 5 from an interior of the bushing 9 through the drying chamber 7 to the measuring element 4 takes place exclusively through the tube 15.

The drying chamber 7 has a molded body, which comprises a polymer matrix and zeolite, or a drying module for receiving a humidity-adsorbing material. The tube 15 leads through the drying chamber 7 to the measuring element 4. Through the humidity-permeable wall of the tube 15, the humidity diffuses from the reference-pressure supply 5 and is adsorbed by the drying chamber 7.

Figure 2A:
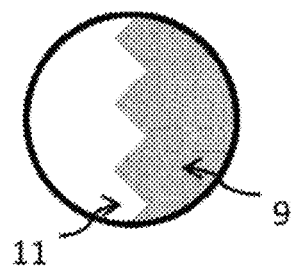
FIG. 2 shows an embodiment of the groove before and after the bushing is pressed into the housing.
Figure 2B:
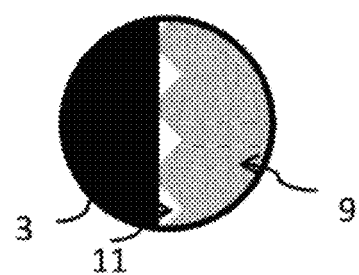

FIGS. 2a and 2b show a possible embodiment of the helical section of the groove 11. The groove 11 in FIG. 2a is designed as a thread. When the bushing 9 is pressed into the housing 3, the outer wall of the bushing 9 is deformed, which leads to a flattening of the outer wall of the thread (FIG. 2b). The flattened section of the outer wall now ensures hermetic tightness between the housing 3 and the bushing 9 in the region of the flattening. As a result, the ambient air can enter the interior of the bushing 9 only along the groove 11.

The invention claimed is:

1. A relative-pressure sensor for determining a pressure of a medium in relation to an atmospheric pressure, comprising a housing;
   a measuring element arranged in the housing, wherein the pressure to be measured acts upon an outer surface of the measuring element, said surface being in contact with the medium;
   a reference-pressure supply, which supplies the atmospheric pressure in the form of ambient air to an inner surface of the measuring element;
   an evaluation unit, which is arranged in the housing, and determines the pressure of the medium from a variable determined using the measuring element; and
   at least one drying chamber arranged in the housing for taking up atmospheric humidity from the ambient air supplied through the reference-pressure supply,
   wherein an opening for the reference-pressure supply is provided in an outer wall of the housing, wherein a cylindrical bushing for the receiving and feeding-through of connecting lines of an electronics and of the reference-pressure supply is provided, wherein the bushing has, in an outer wall facing the inner wall of the housing, a capillary-type groove which is helical at least in sections and runs around the bushing, wherein the groove is arranged with respect to the housing such that the reference-pressure supply from the opening of the housing to the interior of the bushing takes place exclusively along the groove, and wherein the bushing is connected to the housing by press-fitting such that the outer wall of the bushing is deformed and the groove is hermetically sealed between the outer wall of the bushing and the inner wall of the housing.

2. The relative-pressure sensor of claim 1, wherein the groove starts in an end section of the bushing and ends in an opposite end section of the bushing.

3. The relative-pressure sensor of claim 1, wherein the groove has a length and a cross-section, wherein the groove has such a volume that, when the entire air volume within the reference-pressure supply is compressed as a result of a temperature reduction, the groove is only partially filled with new ambient air from the environment of the relative-pressure sensor.

4. The relative-pressure sensor of claim 1, wherein the bushing is made of brass or bronze.

5. The relative-pressure sensor of claim 1, wherein the housing is made of stainless steel.

6. The relative-pressure sensor of claim 1, wherein the bushing is connected to the housing by joining by thermal expansion or shrinking.

7. The relative-pressure sensor of claim 1, wherein a section with an enlargement of the outer diameter of the bushing is arranged on an end region, facing the measuring element, of the bushing, wherein the housing has a section with an enlargement of the inner diameter which corresponds to the section with the enlargement of the outer diameter of the bushing, wherein the corresponding sections of the enlargement of the outer diameter of the bushing and of the enlargement of the inner diameter of the housing engage in a gas-tight manner with one another after the introduction of the bushing into the housing.

8. The relative-pressure sensor of claim 1, wherein a bottom surface is arranged on the end region, facing the measuring element, of the bushing and closes the bushing perpendicularly to the longitudinal axis of the bushing, wherein the bottom surface has at least one opening for the feeding-through of the connecting lines of the electronics and of the reference-pressure supply.

9. The relative-pressure sensor of claim 8, wherein the bottom surface of the bushing is designed as a cast or a glass feedthrough.

10. The relative-pressure sensor of claim 9, wherein the reference-pressure supply is designed in sections as a humidity-permeable tube, wherein the tube is inserted into the at least one opening of the bottom surface in such a way that the reference-pressure supply from an interior of the bushing through the drying chamber to the measuring element takes place exclusively through the tube.

11. The relative-pressure sensor of claim 1, wherein the drying chamber has a drying module for receiving a humidity-adsorbing material or a molded body comprising a polymer matrix and zeolite.

12. The relative-pressure sensor of claim 1 wherein, a metal to metal seal is formed by the outer surface of the bushing and the inner surface of the housing.

13. The relative-pressure sensor of claim 1 wherein the groove is designed as a thread, and the deformation of the outer wall of the bushing includes a flattening of the thread.

\* \* \* \* \*